G. A. HIDDEN.
COMBINATION CHECK AND CUT-OFF VALVE.
APPLICATION FILED APR. 21, 1919.
1,383,207.
Patented June 28, 1921.
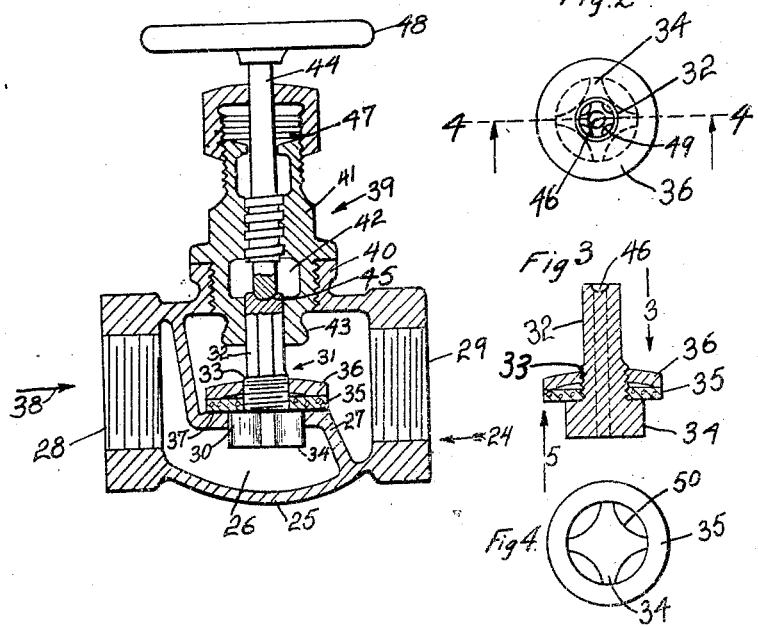

UNITED STATES PATENT OFFICE.

GEORGE A. HIDDEN, OF CORONADO, CALIFORNIA.

COMBINATION CHECK AND CUT-OFF VALVE.

1,383,207.

Specification of Letters Patent. Patented June 28, 1921.

Application filed April 21, 1919. Serial No. 291,742.

*To all whom it may concern:*

Be it known that I, GEORGE A. HIDDEN, a citizen of the United States, residing at Coronado, in the county of San Diego and State of California, have invented new and useful Improvements in Combination Check and Cut-Off Valves, of which the following is a specification.

My object is to make a combination check and cut-off valve, and my invention consists of the novel features herein shown, described and claimed.

Figure 1 is a sectional elevation showing a straight vertical check valve provided with cut-off means in accordance with the principles of my invention.

Fig. 2 is a top plan view of the check member of the valve construction shown in Fig. 2 and as seen looking in the direction indicated by the arrow 3 in Fig. 4.

Fig. 3 is a vertical diametrical sectional detail on the line 4—4 of Fig. 3.

Fig. 4 is a bottom plan view looking in the direction indicated by the arrow 5 in Fig. 4.

The check valve casing 24 has a central portion 25 having a chamber 26, a port wall 27 in the chamber 26, and internally screw threaded nipples 28 and 29 extending from the opposite ends of the portion 25. The port 30 in the port wall 27 is vertical, that is at right angles to the axes of the nipples 28 and 29.

The vertical check valve 31 comprises a guide stem 32, a screw threaded shank 33 extending downwardly from the guide stem, a guide head 34 extending downwardly from the shank 33, a gasket 35 fitting against the head 34, and a circular plate 36 screwed down upon the shank 33 against the gasket 35. The upper face 37 of the port wall 27 is finished around the port 30.

When the check valve construction is incorporated into a pipe line in a horizontal position with the check valve 31 in a vertical position the check valve will rise when liquid flows in the direction indicated by the arrow 38 and will fall when the direction of flow is reversed.

For the purpose of holding the check valve closed to make a positive cut-off, I provide the cut-off mechanism 39.

An internally screw threaded nipple 40 leads downwardly to the chamber 26, a valve stem casing 41 is screwed down into the nipple 40 and has a chamber 42, and a bearing portion 43 extending downwardly from the chamber 42 around the guide stem 32. A valve stem 44 is screw seated in the casing 41 with the point 45 of the valve stem engaging in the recesses 46 in the upper end of the guide stem 32, and a stuffing box 47 is formed around the upper end of the valve stem, so that when it is desired to lock the check valve and make a positive cut-off the handwheel 48 upon the upper end of the valve stem 44 is manipulated to screw the stem down against the check valve and force the gasket 35 tightly against the seat 37.

When it is desired that the check valve shall operate freely the handwheel 48 is manipulated to screw the stem 44 upwardly and release the check valve 31. The guide stem 32 has vertical flutes 49 to provide vents for the chamber 42, and the guide head 34 has similar flutes 50 through which the liquid may flow when the gasket 35 is elevated.

Thus I have produced a combination check and cut-off valve which may be manipulated to operate freely as a check valve when desired, and which may be manipulated to lock the check valve and make a positive cut-off when desired.

Various changes may be made without departing from the spirit of my invention as claimed.

I claim:

A combination check and cut-off valve including a casing provided with an inlet and an outlet, a partition in said casing between said inlet and said outlet, said partition being provided with an opening, a check valve including a threaded shank, a stem extending from one end of said shank, a head extending from the other end of said shank and slidably mounted in the opening in said partition, a bearing in said casing in which said stem is slidably mounted, said head being fluted to allow the liquid to flow through said opening when the check valve is raised, a gasket on said shank resting on said head and adapted to rest on said partition and close said opening, and a plate screwing on said shank against said gasket, said bearing adapted to engage said plate to limit the opening movement of the valve, and a stem screw seated in said casing for engaging the end of said stem to hold the valve positively closed.

In testimony whereof I have signed my name to this specification.

GEO. A. HIDDEN.